United States Patent [19]

Williams et al.

[11] Patent Number: 4,473,673
[45] Date of Patent: Sep. 25, 1984

[54] CAST POLYESTER RESIN PROCESS AND PRODUCT

[75] Inventors: Robert D. Williams, Bangor; Bud G. Struble, East Bangor, both of Pa.

[73] Assignee: Wildon Industries, Inc., Mt. Bethel, Pa.

[21] Appl. No.: 492,575

[22] Filed: May 9, 1983

[51] Int. Cl.³ ............................ C08F 8/46; C08J 3/20
[52] U.S. Cl. .................................... 523/318; 523/171; 523/313; 523/319; 523/340; 523/514; 264/71; 264/72; 264/73; 264/102; 366/239
[58] Field of Search .................. 264/71, 72, 101, 102, 264/73, 349; 425/203, 205, 209; 366/239; 523/171, 313, 318, 319, 340, 514

[56] References Cited

U.S. PATENT DOCUMENTS

| | | | |
|---|---|---|---|
| 1,474,741 | 11/1923 | Tresnak | 366/239 |
| 2,893,102 | 7/1959 | Maxwell et al. | 264/101 |
| 2,971,223 | 2/1961 | Grunin et al. | 264/71 |
| 3,253,303 | 5/1966 | Bradt | 425/203 |
| 3,371,135 | 2/1968 | Goodwin | 264/71 |
| 3,493,031 | 2/1970 | Williams, Jr. et al. | 425/203 |
| 3,562,379 | 2/1971 | Duggins | 264/171 |
| 3,981,951 | 9/1976 | Richman | 264/73 |
| 4,141,929 | 2/1979 | Stoops et al. | 264/331.18 |
| 4,146,364 | 3/1979 | McCormick | 366/239 |
| 4,251,477 | 2/1981 | Christian | 264/101 |
| 4,269,798 | 5/1981 | Ives | 264/73 |
| 4,343,752 | 8/1982 | Cann | 264/71 |

FOREIGN PATENT DOCUMENTS

| | | | |
|---|---|---|---|
| 0861619 | 2/1961 | United Kingdom | 425/209 |
| 0256549 | 6/1970 | U.S.S.R. | 366/239 |
| 0405847 | 4/1974 | U.S.S.R. | 264/101 |

Primary Examiner—Jeffery Thurlow
Assistant Examiner—Patrick Dailey
Attorney, Agent, or Firm—Ruth Moyerman

[57] ABSTRACT

A pretreatment process to remove entrapped air from liquid polyester blends intended as the matrix of cast marble is disclosed. The formulated blend is subjected to a simultaneous evacuating, vibrating and shearing step which is critical within broad parameters. The thus treated blend, after casting, will be non-porous in cross section, thereby making it suitable for countertops and other parts which must be field cut to specifications.

13 Claims, 3 Drawing Figures

CAST POLYESTER RESIN PROCESS AND PRODUCT

BACKGROUND OF THE INVENTION

1. Field of the Invention

This invention relates to synthetic resins, and more particularly to processes for casting polyester resin.

2. Description of the Prior Art

Cast unsaturated polyesters using inert fillers is an art which has been practiced commercially since the early 1960's. Products are known variously as cultured marble, cast marble, precast marble and molded marble. In the 1970's, a synthetic onyx was developed using different fillers. Products in both marble and onyx include table tops, lamp bases, window sills, countertops, wall panels and various items of sanitary-ware such as vanity tops, bathtubs and showers.

Typically, cast marble consists of 20–35% unsaturated polyester resin such as, for example, propylene glycol esterified with adipic and maleic anhydride and filled with an inert material such as calcium carbonate. Cast onyx consists of a specially clarified polyester resin with glass frit and alumina trihydrate used either separately or in combination as the filler. The conventional manufacturing process consists of the following steps:

(1) preparing the molds by covering the surface with a suitable mold release agent, typically a wax or organic alcohol.

(2) spraying the mold surface with a clear, unsaturated polyester resin referred to as a gel coat into which has been incorporated an ultraviolet stabilizer and a thixotrope. An organic peroxide is used as catalyst.

(3) after the gel coat has partially cured, a matrix is troweled or poured into the mold. The matrix is prepared by mixing polyester resin, organic peroxide catalyst, filler and colorants in the desired proportions.

(4) after the molds are filled, they are vibrated for several minutes to try to effect air release from the matrix, but especially from the interface with the gel coat.

(5) the material is then allowed to cure at ambient temperature to a hard and "rigid" state before removal of the formed part from the mold.

A typical example—U.S. Pat. No. 3,562,379 to Duggins—discloses an improved cast marble polyester resin process. U.S. Pat. No. 3,562,379 and U.S. Pat. No. 3,488,346 are also examples of the advanced state of the art.

Cast marble has only one real competitor. In the 1960's, du Pont developed an alumina trihydrate filled methylmethacrylate polymer which it has marketed under the mark "Corian". In competing with methylmethacrylate polymer, cast marble has had several significant advantages. It can be manufactured at a lower cost, it has considerably greater versatility as to colors, shapes and sizes, and its physical properties are better. In addition, it is more satisfactorily repairable.

The major disadvantage of cast marble has been its lack of machineability because of the porosity of the matrix resulting from incomplete removal of entrapped air during the casting operation. Vibrating, as practiced conventionally, is inadequate to remove the air. This has effectively ruled out cast marble in the kitchen countertop market where traditionally the countertops are field cut to specific requirements.

De-gassing agents such as disclosed in U.S. Pat. No. 4,129,543 to Kaplan have been used, but with limited success due to the high viscosity of the resin which inhibits air release. Further, they are expensive in the large quantities called for in, for example, the Kaplan patent and which quantities have heretofore been necessary to achieve even limited success and which, according to the Kaplan patent, may result in surface charring.

Evacuating the blend in the mold tends to devolve styrene monomer preferential to degassing the air and, further, it is not economically feasible to put the large molds common to the industry in vacuum chambers.

There is, therefore, a need for a simple, economical cast marble process which will remove entrapped air from a polyester resin to leave a uniformly dense matrix and to accomplish this end result without deleterious effects on the polymerization process itself.

SUMMARY OF THE INVENTION

The aforementioned prior art problems are solved by the process of this invention in which castable polyester resin is mechanically pre-treated before the casting process in a critical combination of process steps to rupture and release entrapped air, leaving thereby a mterial which, after hardening, may be machined and the exposed edges will be nonporous and uniform, giving a pleasing appearance.

In the process of this invention, an unsaturated polyester resin such as, for example, propylene glycol esterified with adipic and maleic anhydride of about 600 to about 300 centipoise viscosity, and containing styrene monomer as a cross linking agent is first formulated by adding an organic peroxide and solid filler material such as calcium carbonate in the conventional manner to form a blend of about 20 to about 40 weight percent of polyester resin and about 60 to about 80 weight percent filler. In a batch process, this simply means mixing these materials together.

The blend is then transferred to a vacuum vessel. This vessel must include means to allow the blend to be subjected to a shearing action such as, for example, by rocking action or mechanical agitation such as using a slow speed stirrer, and to simultaneously subject the blend to vibration, all while a vacuum is being applied. These three process steps—evacuating, vibrating and shearing—are required to be done concurrently and are critical within certain broad parameters. For example, the vacuum should be between about 15 to about 30 inches of mercury and the vibration is preferable at about 2,000 to about 4,000 cycles per minute.

The mechanisms of this process are (1) to invoke migration of entrapped air to the surface by means of applying a vacuum and vibration, and (2) to facilitate release of this air upon its reaching the surface by shearing of the bubbles by some mechanical means. The latter mechanism is assisted by incorporating into the blend an anti-foam of air release agent whose function is to reduce the surface tension of the liquid. The shearing action is accomplished preferably by rocking the vessel gently over a total of about a 60 degree arc as measured from a line perpendicular to the horizontal plane of the blend. A preferred embodiment also includes preforming the shearing step by inserting into the blend a baffle comprising a series of fingers between which the blend passes as it is being rocked.

The just-described evacuating, vibrating and shearing are critical as to combination. That is, all are required simultaneously. However, there is permissible variation as to the time and quantum. These steps will effectively remove entrapped air which heretofore has been ineffectively removed by other process steps or by the use of degassing or defoaming chemical agents.

After this pretreatment step, it is generally necessary to vibrate the blend again. This vibrating step is accomplished without any accompanying evacuation or shearing and is merely for the purpose of re-incorporating devolved volatiles such as styrene monomer, the entrapped air now being no longer present. This last process step can be accomplished after the blend has been poured into a mold, in which case the vibrator is merely attached to the mold's exterior surface.

The aforementioned pretreating process produces a blend which may be utilized in all conventional casting processes and will produce a cured rigid material, or part, which is substantially void free in cross section. This means that cast marble, which has heretofore been limited to uses as bathroom sinks, table tops, lamps, etc. which are totally precast and merely installed in the field, can now be expanded to such applications as countertops for kitchens, bars, etc. where the material to be used must be cut to fit on the job site.

The cast marble produced by the pretreating process of this invention is pleasing to the eye in cross section and inherently stronger due to the absence of voids in the material.

BRIEF DESCRIPTION OF THE DRAWING(S)

Figure 2:
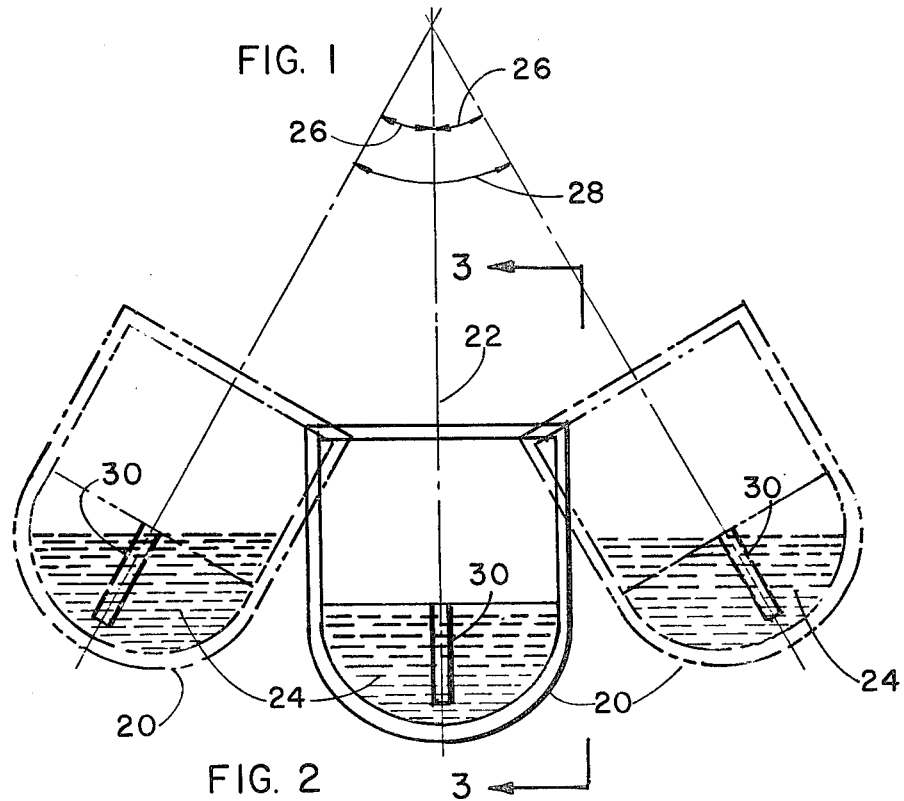
FIG. 2 illustrates as a schematic drawing, a preferred embodiment of the concurrently performed shearing, vibrating and evacuating step.
Figure 3:
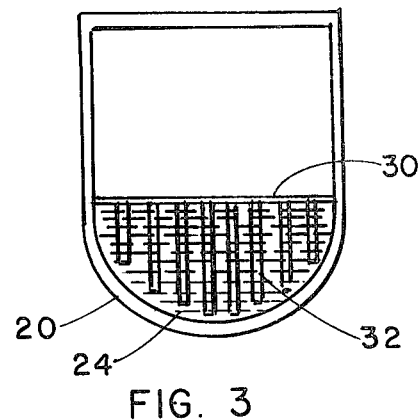

FIG. 3, a front view taken along lines 3—3 of FIG. 2, shows, in longitudinal crosss section, an evacuating vessel containing a baffle suitable for use in the process of this invention.

DETAILED DESCRIPTION OF THE PREFERRED EMBODIMENT(S)

Figure 1:
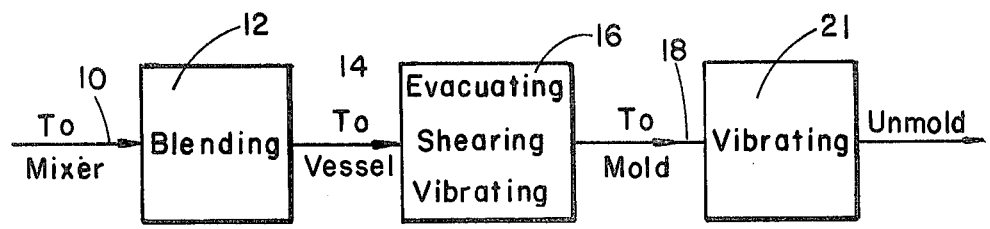
FIG. 1 is a flow diagram showing the process steps of this invention.

Referring now to the drawings, and more particularly to FIG. 1 and at arrow 10, the words "to mixer" are intended to indicate the formulation of a liquid thermosetting polyester resin in a typical batch mixture as indicated in Example I below:

EXAMPLE I 300 grams of polyester resin; 1,200 cp; Silman 585 brand
700 grams of calcium carbonate filler; 325 mesh Pfizer FGD brand
10 grams of 50 percent methyl ethyl ketone peroxide; Superox 709 Reichold Chemicals brand are mixed together. Up to 200 parts per million of poly dimethyl siloxane, Union Carbide SAG 100 may be added, if desired. Any larger amount is not required and the siloxane may be eliminated altogether. The resulting mixture is blended as indicated at step 12 for about five minutes or as long as needed to thoroughly blend the mix. The mix is then transferred as indicated by arrow 14 to a vacuum vessel as indicated at block 16. The vacuum vessel is preferably a rocking vessel capable of tilting at least 30 degrees from vertical in each direction for a total arc of rotation of 60 degrees. The vessel includes means to induce rocking at a frequency of one to two cycles per minute during the evacuation cycle. Additionally, a vibrator is attached to the vessel to induce a vibration cycle of from about 2,000 to about 4,000 cycles per minute.

The combined steps of evacuation, vibration and shearing are performed for about thirty minutes which for a mix of this volume has been found sufficient to rupture and release substantially all the entrapped air.

This shearing action thus described in facilitated by placing, in the vessel prior to the sealing and evacuation, a baffle consisting of a linear series of fingers which extend into the blend so that the blend must pass between the fingers during the rocking cycle.

Following completion of the thirty minute evacuating, shearing and vibrating step, the vessel is opened, a pigment or colorant such as two ounces of titanium dioxide are added to the blend, as is conventional in this art, and the blend, or matrix, is then transferred as indicated at arrow 18 to a mold.

After the blend is poured or trowled into a mold (which may be prepared with a gel coat, etc. as is well known in the art), the mold is vibrated, again at about 2,000 to 4,000 cycles per minute, for a period of about 15 minutes to facilitate redisolving of styrene monomer. At this step in the process, it is important to note that vibration is not for the purpose of releasing air, in as much as little or no air is left, and the vibration at this point would be ineffective for this purpose anyway, as the prior art makes clear. That is, vibration as indicated by step 21 in FIG. 1 is for the sole purpose of reincorporating the devolved volatiles such as styrene monomer back into the blend. Devolving styrene can be readily seen by surface bubble formation and the vibrating step may be eliminated if no devolving takes place.

Referring now to FIG. 2, the critical combination step of evacuating, shearing and vibrating step is shown schematically. In FIG. 2, vessel 20 is shown diagramatically to better illustrate the shearing process. In FIG. 2, vessel 20 is shown first at rest as indicated by lead line 22 and showing blend 24 at rest. Also shown in FIG. 2 are two additional positions of vessel 20, both illustrated in phantom and each showing a 30 degree arc as indicated by arrow 26. Thus, the total arc of rocking of vessel 20 is 60 degrees as indicated by arrow 28.

Also shown in cross section in FIG. 2 is baffle 30 which is better illustrated by reference now to FIG. 3.

In FIG. 3, taken along lines 3—3 of FIG. 2, vessel 20 is shown in cross section again but with baffle 30 shown in front elevation, including fingers 32 between which blend 24 passes during the rocking of vessel 20 which gives rise to the shearing step of the process as previously described.

Following the completion of the shearing, evacuating and vibrating step, vessel 20 is opened. At this point, the colorants or pigments as previously described in Example I are added. Blend 24 is now transferred to a previously prepared mold as indicated at arrow 18 in FIG. 1, and which has previously been described including a gel coating applied in the conventional manner.

There are many variations which may be practiced within the scope of this invention. For example, while described and illustrated as a batch process, the process steps may be combined with a continuous coating process.

Also, although illustrated as a casting process, since the process of this invention is directed to pre-casting, the part forming step itself is not limited to casting, but is also suitable for injection molding as well as all other part forming steps.

Also, this invention is not limited to a rigid mold. A nonrigid, or flexible, mold such is common for decorative items like lamp bases may be used, or parts may be cast in flexible molds using wood fillers such as is common for furniture parts. It should be noted that clear casting resins without fillers may be used such as is common for decorative items.

There are many advantages to the pre-treatment process of this invention. Chiefly is the ability to manufacture cast marble items or parts which are nonporous and, thus, may be machined or cut to leave an exposed edge which is pleasing to the eye. The use of inexpensive mechanical process steps eliminates the need for expensive, and largely ineffective, chemical degassing additives.

Improved physical properties including greater tensile strength (resistance to thermal and mechanical stresses) and greater bond strength between the matrix and the gel coat are additional advantages achieved by the use of the process of this invention.

Having now illustrated and described my invention, it is not intended that such description limit this invention, but rather that this invention be limited only a reasonable interpretation of the appended claims.

What is claimed is:

1. A process for producing a cast polyester resin comprising the steps in serial order:
   (a) formulating a mixture of liquid thermosetting unsaturated polyester resin, including cross-linking monomer and catalyst to form a blend;
   (b) subjecting said blend to a vacuum within predetermined parameters of time and quantum while concurrently vibrating and shearing said blend to rupture and release entrapped air bubbles; and,
   (c) vibrating said blend while it is in the mold to reincorporate devolved volatiles to form a matrix capable of setting and curing to form nonporous, machinable cast marble.

2. The process according to claim 1 wherein said vacuum, shearing and vibrating time of step (b) is about thirty minutes.

3. The process according to claim 1 wherein said vacuum of step (b) is in the range of fifteen to about thirty inches of mercury.

4. The process according to claim 1 wherein said shearing of step (b) is accomplished by subjecting said blend to a constantly changing horizontal plane.

5. The process according to claim 4 wherein said constantly changing horizontal plane is provided by rocking said blend over about a 60 degree arc.

6. The process according to claim 1 wherein shearing of step (b) is accomplished by subjecting said blend to passage through a baffle comprising a series of fingers placed in said blend perpendicular to said horizontal plane.

7. The process according to claim 1 wherein said process is performed as a batch process.

8. The process according to claim 1 wherein said process is performed as a continuous process.

9. The process according to claim 1 wherein said formulation to step (a) comprises about twenty to about forty weight percent of polyester resin characterized by a viscosity of from about 600 to about 3000 centipoise, and wherein said resin cross-linking monomer is styrene, and containing, additionally, a filler selected from the group consisting of calcium carbonate, glass frit, alumina trihydrate and combinations thereof and wherein said filler is from about seventy to about eighty weight percent and passes a three hundred twenty-five mesh and, further, wherein said formulation includes, as a catalyst, about one weight percent of fifty percent methyl ethyl ketone peroxide.

10. The process according to claim 9 wherein said mix includes, additionally, a defoaming agent and wherein before step (c) a pigment is added.

11. A process for pretreating castable polyester resin comprising the following serial steps:
    (a) formulating and blending a mixture of from about twenty to about thirty weight percent, twelve hundred centipoise liquid propylene glycol esterified with adipic and maleic anhydride, unsaturated polyester resin including styrene as a cross-linking monomer, from about seventy to about eighty weight of a filler selected from the group consisting of calcium carbonate and alumina trihydrate of about three hundred twenty-five mesh and no more than about two hundred parts per million by weight of dimethyl polysiloxane as a defoamer and about one weight percent of fifty percent methyl ethyl ketone peroxide as a catalyst;
    (b) subjecting said blend to a vacuum of from about fifteen to about twenty-five inches to mercury for about thirty minutes while concurrently rocking said blend by tilting said blend over a total of about a 60 degree arc as measured from a line perpendicular to said horizontal plane at about one to two cycles per minute, all while vibrating said blend at about two thousand to four thousand cycles per minute to rupture and release entrapped air bubbles to form a mold ready matrix;
    (c) introducing said matrix into a prepared mold;
    (d) vibrating said mold at from about two thousand to about four thousand cycles per minute for a period of about fifteen minutes to re-incorporate devolving styrene; and,
    (e) allowing said blend to set and cure to form a nonporous, machinable cast marble molded part.

12. A cast polyester resin, said resin produced by:
    (a) formulating a mixture of liquid thermosetting unsaturated polyester resin, including cross-linking monomer and catalyst to form a blend;
    (b) subjecting said blend to a vacuum within predetermined parameters of time and quantum while concurrently vibrating and shearing said blend to rupture and release entrapped air bubbles;
    (c) molding said blend;
    (d) vibrating said blend while in the mold to reincorporate devolved volatiles; and,
    (e) allowing said blend to set and cure while in said mold to form thereby a nonporous, machinable cast marble.

13. A cast polyester resin produced by the following serial steps:
    (a) formulating and blending a mixture of from about twenty to about thirty weight percent, twelve hundred centipoise liquid propylene glycol esterified with adipic and maleic anhydride, unsaturated polyester resin including styrene as a cross linking monomer, from about seventy to about eighty weight of a filler selected from the group consisting of calcium carbonate and alumina trihydrate of about three hundred twenty-five mesh, and no more than about two hundred parts per million by weight of dimethyl polysiloxane as a defoamer, and about one weight percent of fifty percent methyl ethyl ketone peroxide as a catalyst;
    (b) subjecting said blend to a vacuum of from about fifteen to about twenty-five inches of mercury for about thirty minutes while concurrently rocking said blend by tilting said blend over a total of about a 60 degree arc as measured from a line perpendicular to said horizontal plane at about one to two cycles per minute, all while vibrating said blend at about two thousand to four thousand cycles per minute to rupture and release entrapped air bubbles to form a mold ready matrix;

(c) introducing said matrix into a prepared mold;
(d) vibrating said mold at from about two thousand to about four thousand cycles per minute for a period of about fifteen minutes to re-incorporate devolving styrene; and,
(e) allowing said blend to set and cure to form a non-porous, machine cast, molded part.

* * * * *